(12) United States Patent
Kim

(10) Patent No.: US 9,257,872 B2
(45) Date of Patent: Feb. 9, 2016

(54) LINEAR MOTOR

(76) Inventor: Houng Joong Kim, Seoul (KR)

(*) Notice: Subject to any disclaimer, the term of this patent is extended or adjusted under 35 U.S.C. 154(b) by 279 days.

(21) Appl. No.: 13/817,111

(22) PCT Filed: Aug. 4, 2011

(86) PCT No.: PCT/KR2011/005725
§ 371 (c)(1),
(2), (4) Date: Feb. 14, 2013

(87) PCT Pub. No.: WO2012/026685
PCT Pub. Date: Mar. 1, 2012

(65) Prior Publication Data
US 2013/0154398 A1 Jun. 20, 2013

(30) Foreign Application Priority Data

Aug. 23, 2010 (KR) .................. 10-2010-0081522

(51) Int. Cl.
*H02K 1/06* (2006.01)
*H02K 41/03* (2006.01)
*H02K 1/27* (2006.01)
*H02K 1/28* (2006.01)
*H02K 3/28* (2006.01)
*H02K 7/08* (2006.01)

(52) U.S. Cl.
CPC .............. *H02K 1/06* (2013.01); *H02K 41/031* (2013.01); *H02K 1/276* (2013.01); *H02K 1/28* (2013.01); *H02K 3/28* (2013.01); *H02K 7/08* (2013.01); *H02K 2201/06* (2013.01); *H02K 2207/03* (2013.01); *H02K 2213/03* (2013.01)

(58) Field of Classification Search
CPC ........... H02K 1/06; H02K 1/276; H02K 1/28; H02K 2201/06; H02K 2207/03; H02K 2213/03; H02K 3/28; H02K 41/031; H02K 7/08
USPC ............................................ 310/12.24, 12.25
See application file for complete search history.

(56) References Cited

U.S. PATENT DOCUMENTS 4,151,431 A * 4/1979 Johnson ..................... 310/12.24
4,704,553 A * 11/1987 Resnicow ................. 310/12.12
5,751,075 A * 5/1998 Kwon et al. ............... 310/12.24
(Continued)

FOREIGN PATENT DOCUMENTS

CN 1068990 C 7/2001
CN 1178367 C 12/2004
(Continued)

*Primary Examiner* — Alex W Mok
(74) *Attorney, Agent, or Firm* — Birch, Stewart, Kolasch & Birch, LLP

(57) ABSTRACT

A linear motor is provided. The linear motor includes a first member including a plurality of armature modules each comprising a magnetic core, a plurality of salient poles, and coils, where the coils are wound around a portion or all of the salient poles or the magnetic core between the salient poles; and a second member including one or more permanent magnet modules each including a plurality of permanent magnets each projected toward the magnetic core to be arranged between two salient poles of the armature module, where poles of the permanent magnets are alternated in a moving direction of the linear motor. Power is supplied to the coil of each armature module such that a thrust according to a traveling magnet fie is generated by using as one unit an S number of armature modules and a P number of permanent magnets arranged in the moving direction.

15 Claims, 13 Drawing Sheets

(56) References Cited

U.S. PATENT DOCUMENTS

| | | | |
|---|---|---|---|
| 6,329,728 | B1 | 12/2001 | Kitazawa et al. |
| 6,469,412 | B1 * | 10/2002 | Patarchi .................. 310/158 |
| 6,664,663 | B1 * | 12/2003 | Yeo ........................ 310/12.16 |
| 6,803,682 | B1 * | 10/2004 | Thirunarayan et al. .... 310/12.24 |
| 2002/0043879 | A1 | 4/2002 | Joong et al. |
| 2002/0089238 | A1 | 7/2002 | Rudy |
| 2005/0212362 | A1 | 9/2005 | Emoto |
| 2008/0088200 | A1 * | 4/2008 | Ritchey .................... 310/268 |
| 2009/0085412 | A1 * | 4/2009 | Takeuchi .................. 310/12 |
| 2012/0187779 | A1 | 7/2012 | Lee |
| 2013/0082545 | A1 * | 4/2013 | Goto et al. ............... 310/12.24 |

FOREIGN PATENT DOCUMENTS

| | | |
|---|---|---|
| JP | 2000-262034 A | 9/2000 |
| JP | 2002-175913 A | 6/2002 |
| KR | 2002-0029293 A | 4/2002 |
| KR | 10-0964538 B1 | 6/2010 |
| KR | 10-0964539 B1 | 6/2010 |

* cited by examiner

Fig. 3
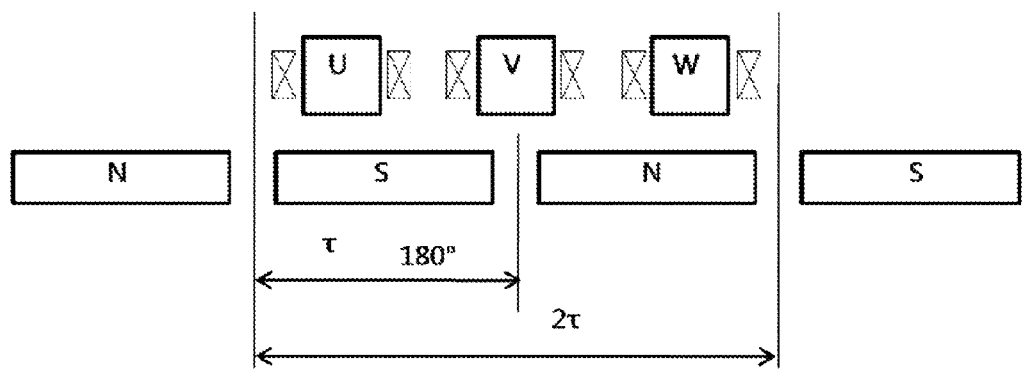
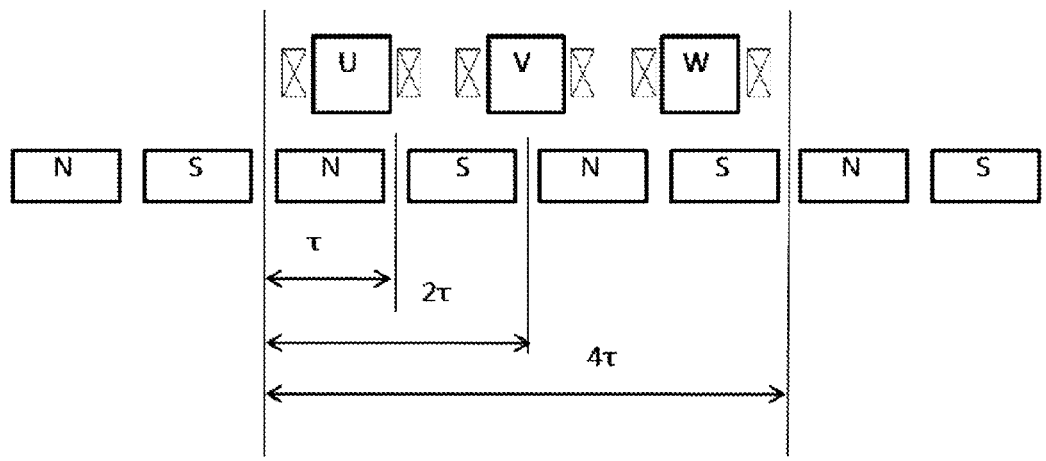

Fig. 8
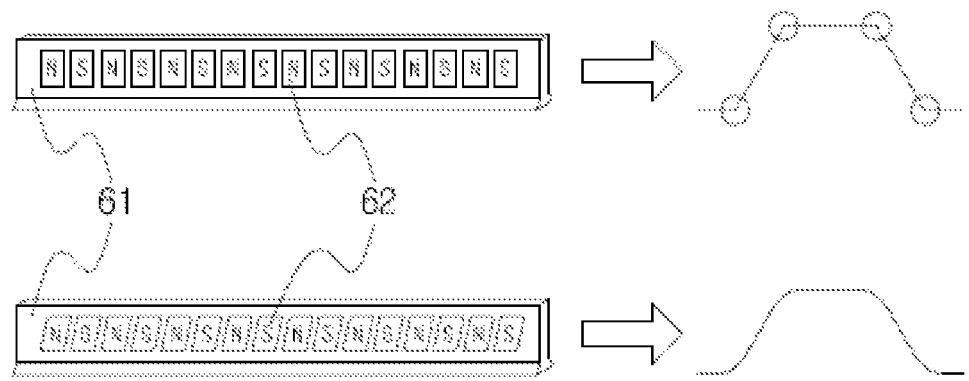
[Fig. 9]
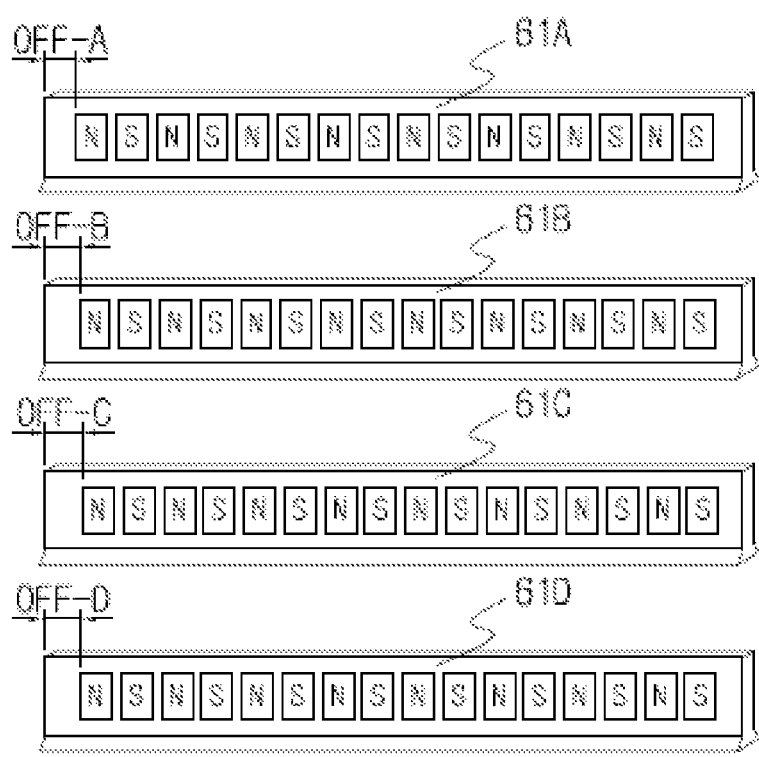

LINEAR MOTOR

This nonprovisional application claims priority under U.S.C. §119(a) on Patent Application No. 10-2010-0081522 filed in Republic of Korea on Aug. 23, 2010 the entire contents of which are hereby incorporated by reference.

BACKGROUND

1. Field

This document relates to a linear motor generating a rectilinear motion.

2. Related Art

In general, a linear motor has a structure that generates a thrust between a mover and a stator that face each other in a straight line. A permanent magnet type linear motor is constructed in such a manner that a fixed magnet is arranged at one of a mover and a stator and alternating multi-phase power is applied to the other to generate an electromagnetic force between the motor and the stator so as to produce a thrust.

A conventional linear motor has a structure that a rotary motor is unfolded and arranged in a straight line, and thus a strong magnetic pull is generated from an armature core and a permanent magnet. Accordingly, system precision is degraded and wear and tear on a guiding mechanism that maintains a predetermined gap becomes very serious.

SUMMARY

An aspect of this document is to provide a linear motor for preventing the generation of a magnetic pull in a plate type linear motor and widening the effective area of a gap between a salient pole of an armature core generating a thrust, and a permanent magnet facing the salient pole so as to improve the efficiency.

Another object of the present invention is to provide a linear motor for preventing the deflection of a permanent magnet, which is a second member, due to its weight, thus enabling long-distance transfer.

In an aspect, a linear motor includes: a first member including a plurality of armature modules each of which comprises a magnetic core, a plurality of salient poles projected from the magnetic core, and coils, where the coils through which a current of a single phase flows are wound around a portion or all of the salient poles or the magnetic core between the salient poles; and a second member including one or more permanent magnet modules each including a plurality of permanent magnets, the permanent magnet module being projected toward the magnetic core to be arranged between two salient poles of the armature module, where poles of the plurality of permanent magnets are alternated in a moving direction of the linear motor, wherein power having a predetermined phase difference is supplied to the coil of each armature module such that a thrust according to a traveling magnet field is generated by using as one unit an S number of armature modules and a P number of permanent magnets arranged in the moving direction, and one of the first member and the second member is a mover, and another one is a stator such that the mover and the stator are moved relative to each other by the generated thrust.

In an embodiment, in each armature modules the coils may be wound round the salient poles such that neighboring salient poles in each of the armature modules have different polarities, and each permanent magnet in one permanent magnet module may have a polarity different from that of a permanent magnet in another permanent magnet module neighboring the one permanent magnet module in a direction perpendicular to the moving direction.

In an embodiment, a magnetization direction of the permanent magnets of the permanent magnet module may face two corresponding salient poles.

In an embodiment, a cross-section of the permanent magnet through which a magnetic flux passes in the permanent magnet module may have a rectangular or parallelogram shape.

In an embodiment, a location offset of the permanent magnets of at least one permanent magnet module may be different from a location offset of another permanent magnet module within a range smaller than a width of the permanent magnet in the moving direction.

In an embodiment, the second member may further include a connection part connecting the permanent magnet modules, the connection part having recesses elongated in the moving direction to fix the permanent magnet modules, and the permanent magnet modules each have a protrusion to be inserted into the recess portion of the connection part, wherein the protrusion of the permanent magnet module and the recess portion of the connection part are slidingly coupled with each other.

In an embodiment, the number of permanent magnet modules may be the same as or smaller than the number of salient poles.

In an embodiment, the magnetic core may have a circular ring shape or a polygonal ring shape, four or more even-numbered salient poles may be projected from the magnetic core so as to have point symmetry or line symmetry, and the number of permanent magnet modules may be the same as the number of salient poles.

In an embodiment, the magnetic core may have an arc shape surrounding the second member and having line symmetry, the salient poles may be projected from the magnetic core to have line symmetry, and the number of permanent magnet modules may be smaller than the number of salient poles by one.

In an embodiment, a section, perpendicular to the moving direction, of an end portion of each salient pole may have two radial lines such that a gap between the salient pole and the permanent magnet corresponding to the salient pole is uniform over an entire surface where the salient pole and the permanent magnet face each other. The coil may be wound in a portion, near to the magnet core, of the salient pole.

In an embodiment, two or more of the salient poles may be projected from the magnetic core in the same direction, and the number of permanent magnet modules may be smaller than the number of salient poles by one.

In an embodiment, the second member may further include a connection part connecting the permanent magnet modules, and the permanent magnet module may be projected from the connection part toward the magnetic core.

In an embodiment, the first member or the second member may have a length longer than the one unit including the S number of armature modules and the P number of permanent magnets.

In an embodiment, the magnetic body of the armature module may have a stratified form.

BRIEF DESCRIPTION OF THE DRAWINGS

The implementation of this document will be described in detail with reference to the following drawings in which like numerals refer to like elements.

FIG. 3 illustrates the fundamentals of generating a rectilinear thrust according to a combination of the armature module shown in FIG. 1 and the permanent magnet module shown in FIG. 2;

FIG. 8 illustrates the rectangular section and parallelogram section of a permanent magnet through which a magnetic flux passes by way of example;

FIG. 9 illustrates an example where a location offset of permanent magnets in at least one permanent magnet module is different from that of another permanent magnet;

DETAILED DESCRIPTION

Hereinafter, embodiments of a linear motor will be described in detail with reference to accompanying drawings.

The linear motor according to the present invention has a driving principle almost similar to that of a linear motor disclosed in Korean Patent Application No. 10-2009-0090806 (Registration No. 10-0964538). Thus, the structure and driving principle of a cylindrical linear motor disclosed in 10-2009-0090806 will now be described.

Figure 1:
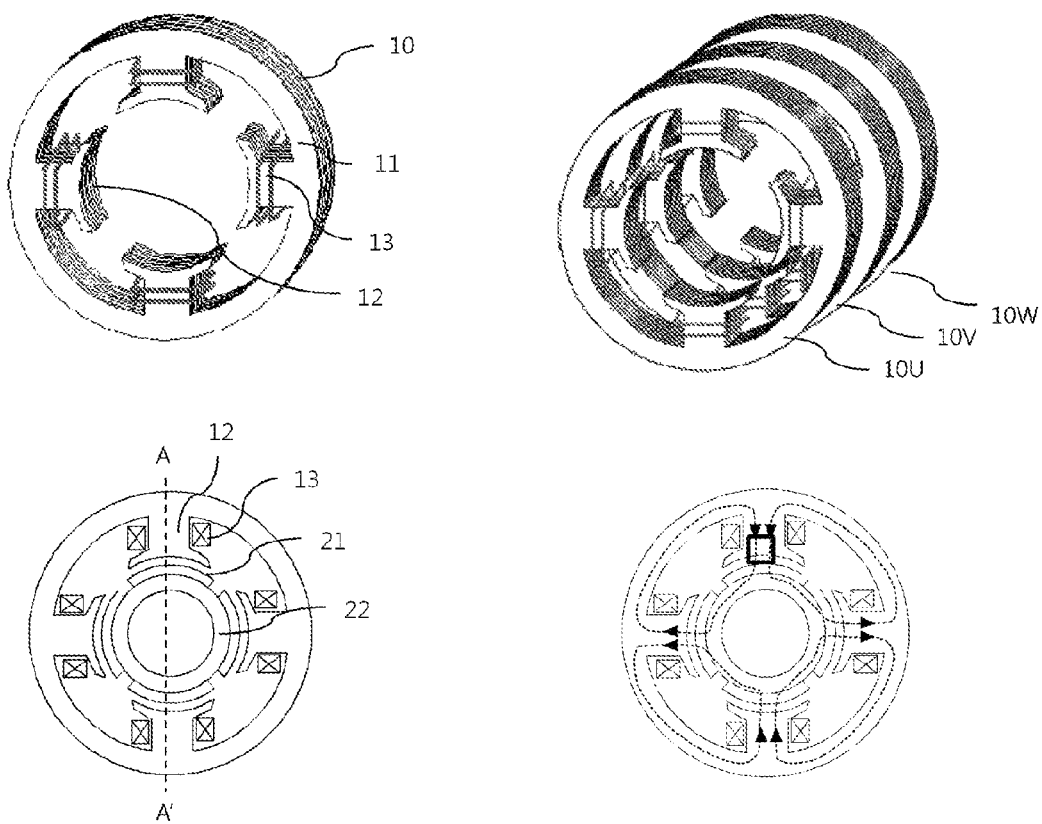
FIG. 1 illustrates an armature module of an inner magnet type linear motor having a permanent magnet, a second member, located inside, and an armature, a first member, located outside.
Figure 2:
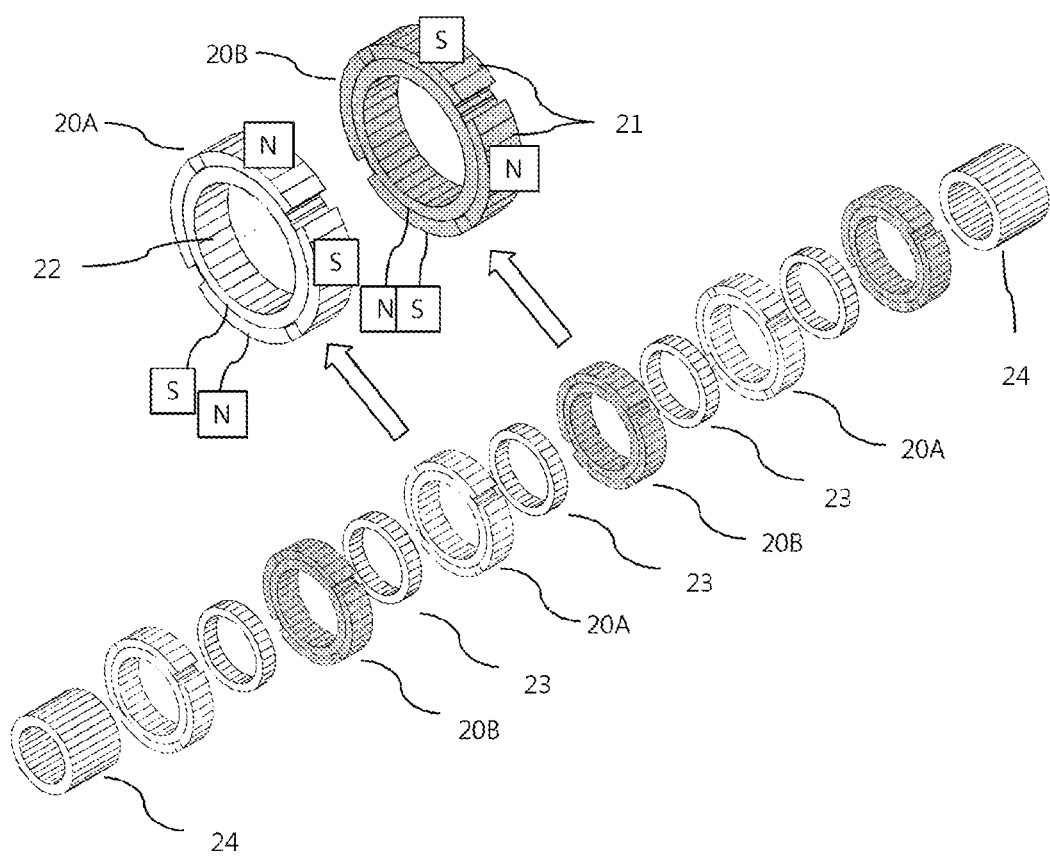
FIG. 2 illustrates a permanent magnet module of the inner magnet type linear motor.

The cylindrical linear motor disclosed in 10-2009-0090806 may include a first member and a second member. FIGS. 1 and 2 respectively illustrate armatures and permanent magnets of an inner magnet type linear motor where the permanent magnets, the second member, are located inside, and the armatures, the first member, are located outside.

As shown in FIG. 1, the first member includes a plurality of armature modules 10 arranged at a predetermined interval in a moving direction. Each armature module 10 has a ring-shaped magnetic core 11, at least four salient poles 12 projected from the magnetic core 11 in a radial direction, and coils 13 wound around the salient poles 12. Here, the ring shape is not limited to a circular ring and may include rectangular and octagonal rings that form a closed circuit.

As shown in FIG. 2, the second member includes a plurality of permanent magnet modules 20 arranged at a predetermined interval in the moving direction. Each permanent magnet module 20 includes permanent magnets 21 formed in a circumferential direction. Here, the number of poles of the permanent magnets 21 is identical to the number of salient poles 12 around which the coils 13 are wound.

Current is supplied to the coils 13 such that a traveling magnetic field is formed in the respective salient poles 12 with the coils 13 wound around them. Here, the coils 13 of at least one of the armature modules 10 may be provided with a current having a phase difference from a current supplied to the coils of another armature module 10 such that a moving thrust is generated due to an attractive force and a repulsive force between electromagnetic poles formed at the ends of the salient poles 12 with the coils 13 wound around them, and the permanent magnets 21 corresponding to the electromagnetic poles.

One of the first and second members serves as a stator by being fixed, and the other serves as a mover. The mover and the stator move relative to each other while maintaining a predetermined gap between the salient poles 12 of the armature module 10 and the permanent magnets 21.

The electromagnetic polarities of neighboring salient poles 12 in each armature module 10 are rendered different from each other such that a high-density magnetic flux smoothly flows between the salient poles 12 and the permanent magnets 21 corresponding to the salient poles 2. For example, in a case where the armature module 10 has four salient poles 12, the coils 13 may be respectively wound around the salient poles 12 such that the first and third salient poles from a predetermined reference point in a clockwise direction have the same polarity, and the second and fourth salient poles have the same polarity when a single-phase current flows through the coils 13.

For example, as shown in FIG. 1, a magnetic flux from the first or third salient pole passes through the first or third permanent magnet corresponding to the first or third salient pole, a permanent magnet yoke, and the second and fourth permanent magnets, is applied to the second and fourth salient poles, passes through the core, and then is applied to the first and third salient poles to thus form a magnetic flux closed loop. Furthermore, the assembly efficiency of the armature module 10 can be improved by winding the coils 13 through which a single-phase current flows around the salient poles 12 of each armature module 10 while changing the winding direction. The coils 13 may be connected to each other with one line.

When the linear motor is applied to a place where a moving speed of the mover is not high, the frequency of power supplied to the coils 13 is not high, and thus the linear motor can be manufactured with the coil 11 not stratified. Accordingly, the manufacturing cost is saved and mass production of the linear motor with high durability can be achieved. When the linear motor requires a high conveying speed, the frequency of power supplied to the coils 13 is high. Accordingly, the core 11 is used in a stratified form, and thus eddy current loss and hysteresis loss generated in the cores 11 can be reduced.

As shown in FIG. 2, in each permanent magnet module 20, the same number of permanent magnets 21 as that of the salient poles 12 of the armature module 10, namely, an even number of four permanent magnets 21 or more, are arranged in the circumferential direction and fixed to the yoke 22 that is a ferromagnetic body, while neighboring permanent magnets 21 have a different polarity. Here, the permanent magnets 21 are magnetized in the central direction, that is, in the radial direction, such that a magnetic flux radiated from the salient poles 12 with the coils 13 wound around them is applied to the yoke 22 through the permanent magnets 21 respectively corresponding to the salient poles 12 or a magnetic flux radiated from the permanent magnets 21 is applied to the salient poles 12 respectively corresponding to the permanent magnets 21. That is, the permanent magnets 21 are magnetized into outer N pole/inner S pole or outer S pole/inner N pole. The magnetic field of the permanent magnets 21 is formed in the radial direction which is perpendicular to a direction in which a thrust is generated (a moving direction of the mover), thus enhancing the efficiency of the magnetic circuit.

Neighboring permanent magnet modules 20A and 20B are separated from each other at a predetermined interval therebetween or have a nonmagnetic spacer 23 interposed between the two modules 20A and 20B, and they are arranged such that two permanent magnets 21 located corresponding to each other in the circumferential direction have different polarities. For example, as shown in FIG. 2, the permanent magnet module A 20A includes permanent magnets 21 sequentially arranged in the order of N, S, N and S poles from a reference point of the circumferential direction, and the permanent magnet module B 20B neighboring the permanent magnet module 20A includes permanent magnets 21 sequentially arranged in the order of S, N, S and N poles from the reference point. End stator 24 may be arranged at both ends of the second member.

FIG. 3 illustrates the principle of generating a rectilinear thrust according to a combination of at least two armature modules 10 and at least two permanent magnet modules 20 shown in FIGS. 1 and 2, and shows part of a cross-sectional view taken along line A-A' of FIG. 1.

In FIGS. 3, U, V and W represent salient poles 12 located in the same position based on the circumferential direction in the armature modules 10U, 10V and 10W shown in FIG. 1 and arranged in the moving direction, and S and N represent permanent magnets 21 arranged to face the salient poles U, V and W.

Since a single-phase current is supplied to the coils of each armature module 10 as described above with reference to FIG. 1, 3-phase currents may be applied to a set of three armature modules 10U, 10V and 10W. That is, in the case of 3-phase, the current each having a phase difference of 120° from neighboring modules are respectively supplied to the coils of the armature modules 10U, 10V and 10W. Alternatively, the current each having a phase difference of 60° from neighboring modules may be supplied to the coils of each armature module 10. For example, X-phase, Y-phase and Z-phase currents each having a phase difference of 60° are supplied sequentially to three consecutive armature modules while the direction in which a coil through which the Y-phase current flows is connected may be changed by 180° from the coils through which the X-phase and Z-phase currents flow.

Also, as shown in FIG. 3, when the pole pitch of the permanent magnets S and N alternately arranged in the moving direction is τ (½ period, 180°), the three armature modules 10U, 10V and 10W are arranged at an interval corresponding to ⅔τ (120°).

While an AC current with a peak value (P) is supplied through the coil wound around the salient pole V located between the permanent magnets of S and N poles in a positive (+) direction, and thus the salient pole V becomes an N pole, an AC current with a magnitude corresponding to peak value/square root of 2 is supplied through the coils wound around the salient poles U and W in a negative (−) direction, and thus the salient poles U and W become S poles. Accordingly, the salient pole V corresponding to the N pole applies an attractive force to the permanent magnet of the S pole and applies a repulsive force to the permanent magnet of the N pole, thus moving the permanent magnets to the right. Although a repulsive force and an attractive force are respectively generated between the permanent magnets of the S and N poles and the salient poles U and W that become the S poles according to a magnetic force smaller than that of the salient pole V corresponding to the N pole, the attractive force and the repulsive force are cancelled each other, and thus the salient poles U and W do not affect the movement of the permanent magnets.

The permanent magnets are moved by ⅔ pole pitch, and thus the salient pole W is located between the permanent magnets of the S and N poles. In this state, when a current of which the phase advances by 120° is supplied through the coil of each salient pole and a current with the peak value (P) is supplied through the coil wound around the salient pole W in the positive (+) direction, the salient pole W becomes an N pole. In addition, an AC current with the magnitude corresponding to the peak value/square root of 2 is supplied through the coils wound around the salient poles U and V in the negative direction such that the salient poles U and V become S poles. Accordingly, an attractive force is generated between the salient pole W corresponding to the N pole and the permanent magnet of the S pole and a repulsive force is generated between the salient pole W and the permanent magnet of the N pole so as to move the permanent magnets to the right. The salient poles U and V that become the S poles according to a magnetic force smaller than that of the salient pole W corresponding to the N pole respectively produce a repulsive force and an attractive force on the permanent magnets S and N. However, the attractive force and the repulsive force are canceled each other.

The aforementioned operation is repeated to move the permanent magnets to the right. That is, the 3-phase currents applied to the armature modules generate a traveling magnetic field in the salient poles U, V and W, and thus a thrust that moves the magnets to the right is generated.

Although description has been made on the assumption that the coils wound around the salient pole U, V, W in the same direction, coils may be wound around salient poles of neighboring armature modules, which correspond to each other, in opposite directions. That is, the coils may be wound around the salient poles U and W in the same direction, and the coil may be wound around the salient pole V in a direction opposite to the winding direction of the coils wound around the salient poles U and W. Even in this case, currents having a phase difference can be supplied to generate a thrust that moves the permanent magnets in the same direction.

In an detail case, the thrust for moving the permanent magnets is proportional to the sum of surface areas of contact portions of the salient poles and the permanent magnets, the magnitude of current applied to the coils, coils turns of the coils wound around the salient poles, and the magnitude of the magnetic force of each permanent magnet.

The first example of FIG. 3 shows a basic combination of 3-phase armature modules and 2-pole permanent magnets and the second example of FIG. 3 shows a combination of 3-phase armature modules and 4-pole permanent magnets. These two examples have the same fundamentals of generating a thrust. Furthermore, a combination of 3-phase armature modules and 8-pole permanent magnets is also available.

That is, a magnetic circuit based on a combination of the number S of armature modules, which corresponds to a multiple of a motor constant, and the number P of permanent magnet modules is considered as a basic unit of a motor to generate a thrust. Here, the motor constant is 3 if the armature modules are driven with 3-phase power and 5 if the armature modules are driven with 5-phase power. An odd-numbered motor constant equal to or greater than 3 is generally used and a phase difference of currents applied to the coils of each armature module is determined by the motor constant.

Here, ripples in the thrust decrease as the least common multiple of S and P increases. Furthermore, as the ratio of S to P, that is a winding factor, becomes close to 1, symmetry efficiency of the magnetic circuit increases. Table 1 shows combinations of armature modules and permanent magnet modules in the case of a 3-phase motor. A combination of 9 armature modules and 8 or 10 permanent magnets is advantageous in terms of efficiency and ripples.

TABLE 1

| Number of Armature Modules (S) | Number of Permanent Magnet Modules (P) | | | | | |
|---|---|---|---|---|---|---|
| 3 | 2 | 3 | 2 | 3 | 2 | 3 |
| 6 | 4 | 6 | 4 | 6 | 4 | 6 |
| 9 | 6 | 9 | 6 | 9 | 6 | 9 |
| 12 | 8 | 12 | 8 | 12 | 8 | 12 |

When the length (length in the moving direction) of a region in which the S armature modules face the P permanent magnet modules having a gap between the armature modules and the permanent magnet modules is referred to as a unit length of the motor, an effective distance capable of generating a thrust that moves the mover can be secured only when one of the first member composed of multiple armature modules and the second member composed of multiple permanent magnet modules is equal to or longer than the unit length. Furthermore, the length of the overlap portion of the first member and the second member is made to be as long as a natural-number multiple of the unit length, that is, the basic units of the motor are repetitively connected, so that the thrust can be increased in proportion to the length of the overlap portion.

When the basic unit of the magnetic circuit is repeatedly connected and the number (P) of permanent magnets constituting the basic unit is an odd number, if the permanent magnets of the first basic unit begin with an N pole (or an S pole), it ends with an N pole (or an S pole). Since the permanent magnets of the second basic unit begin with an S pole (or an N pole), each armature module of the second basic unit needs to be provided with the current of an opposite phase from the corresponding armature module of the first basic unit.

For example, when two motors having the basic unit of (S, P)=(6, 5) are connected, if a 3-phase current is applied to six armature modules of the first basic unit in the order of uUV-vwW, a 3-phase current needs to be applied to six armature modules of the second basic unit in the order of UuvVWw. Here, U, V, W (or u, v, w) have phase differences of 120° from each other, and lower cases u, v and w means that the current of an opposite phase from upper cases U, V and W is supplied.

Furthermore, a motor may be driven with 2-phase power. In this case, even when 2-phase currents of a phase difference of 90° are supplied to two armature modules in the state where armature modules are separated by the half (τ/2) of the pole pitch of the permanent magnets, a thrust that can move the permanent magnets to one side can be generated.

Since the cross-section of the motor shown in FIGS. 1 and 2 have all the elements symmetrically arranged, a magnetic pull generated by each armature and a permanent magnet is canceled, and no external force is generated at a guide guiding the rectilinear motion of the mover. Thus, the lifespan of the guide can be prolonged.

In FIG. 1, the core 11 of the armature module 10 has a circular shape, but may have a polygonal shape in point symmetry or line symmetry, such as a hexagon, an octagon, and a decagon. To ensure safe posture, the core 11 has a rectangular outer edge, and holes may be formed in the corners of the rectangular core 11 in order to facilitate coupling with a neighboring armature module 10.

Also, the embodiment shown in FIGS. 1 to 3 is associated with a 4-slot type motor having four salient poles arranged in the circumferential direction, but a 8-slot type motor having 8 salient poles may be configured when a high magnetic flux is required for high capacity, high speed or the like and thus there is a need to increase the cross-section of a motor. When the sectional area of a salient pole is increased to increase the amount of magnetic flux flowing through the armature module, a core through which the magnetic flux is to flow is increased in the radial direction in proportion to the increase in the sectional area, thus increasing the sectional area of the motor. In this case, by increasing the number of salient poles instead of increasing the sectional area of the salient pole, the amount of magnetic flux can be increased while the thickness of the core is maintained, which is advantageous in miniaturizing a motor or improving a thrust.

FIGS. 1 to 3 illustrate an embodiment for an inner magnet type in which a first member of an armature module is located outside and a second member of a permanent magnet module is located inside. However, FIG. 4 illustrates an embodiment for an outer permanent magnet type linear motor where an armature module is located inside and a permanent magnet module is located outside.

The operation principle of this outer permanent magnet type linear motor is identical to that of the inner magnet type except that a salient pole is projected in a radial direction from a core toward an outer circumference, and a permanent magnet facing the salient pole is fixed inside a ring-shaped yoke.

Figure 4:
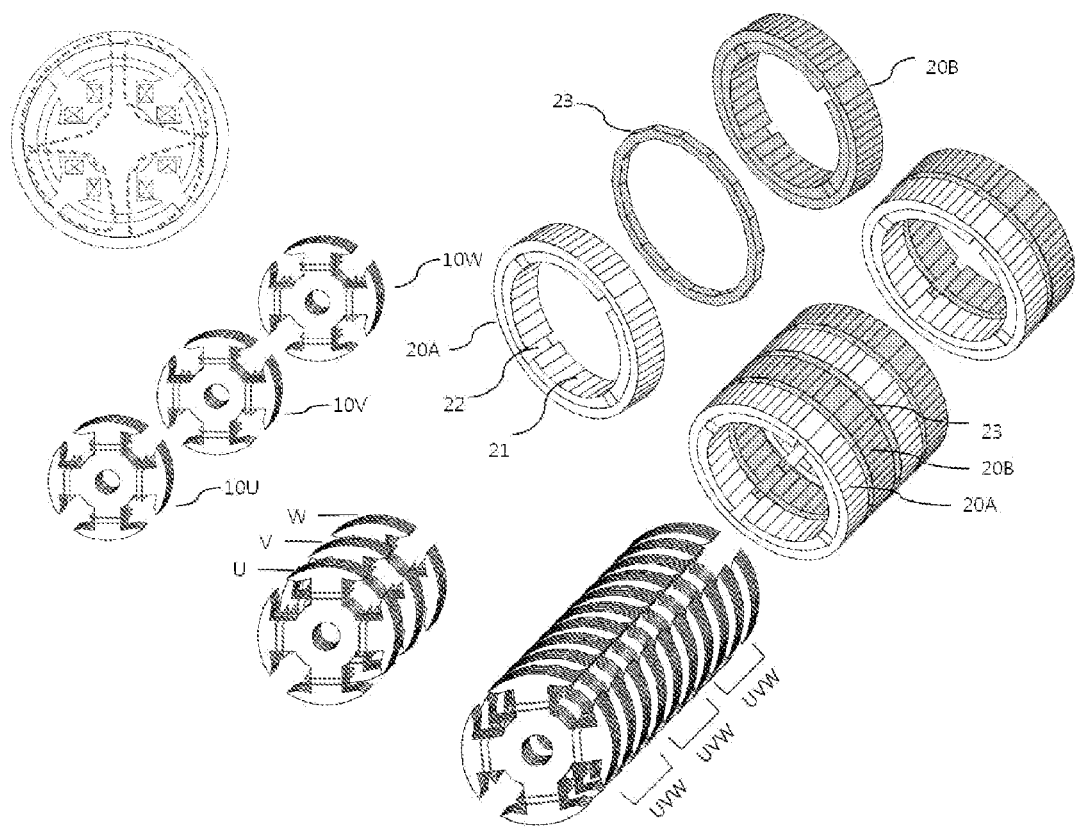
FIG. 4 illustrates an outer magnet type linear motor.

Referring to FIGS. 1 and 4, 3-phase currents are applied to the armature modules 10 in the order of UVW, UVW and UVW in the moving direction. However, the 3-phase current may be applied thereto in the order of UuU, VvV, and WwW.

First members are configured as independent armature modules without being connected to each other (a ferromagnetic body, which is the same material as a core of the first member). For this reason, if power having the same magnitude is provided to the respective armature modules, a magnetic flux independently flows through each armature module with the same magnitude, which results in less variation in thrust produced by the armature modules and thus reduces ripples in the thrust. Since the magnetic flux is evenly distributed through each salient pole without being concentrated in a specific salient pole, a high magnetic flux can be made to flow even when the sectional area of the core of the armature module is small. Furthermore, the magnetic flux flows in the armature modules by independent magnetic circuits, and thus no magnetic flux flows in the same direction as the moving direction of the mover. Accordingly, the magnetic flux flows in only the direction perpendicular to the moving direction, ensuring less leakage magnetic flux irrelevant to a thrust and enhancing motor efficiency.

The linear motor disclosed in 10-2009-0090806 has a closed type structure in which a ring-shaped armature module surrounds a permanent magnet module, and second members of permanent magnets are fixed at only both ends in a movable coil type motor. This aspect does not cause any problem in a conveying device requiring high precision in a short distance; however, in a case where the motor is applied to a long-distance conveying device, the weight of the permanent magnets brings about deflection, causing problems.

Korean patent application No. 10-2009-0099828 (registration No. 10-0964539) proposes an embodiment of an open type motor utilizing the operational principle of the linear motor disclosed in 10-2009-0090806 while modifying the section (based on a plane perpendicular to the moving direction) of a motor, namely, the sectional shapes of armature modules and permanent magnet modules so as to ground every second member in the moving direction or support them on the ground at predetermined intervals.

Figure 5:
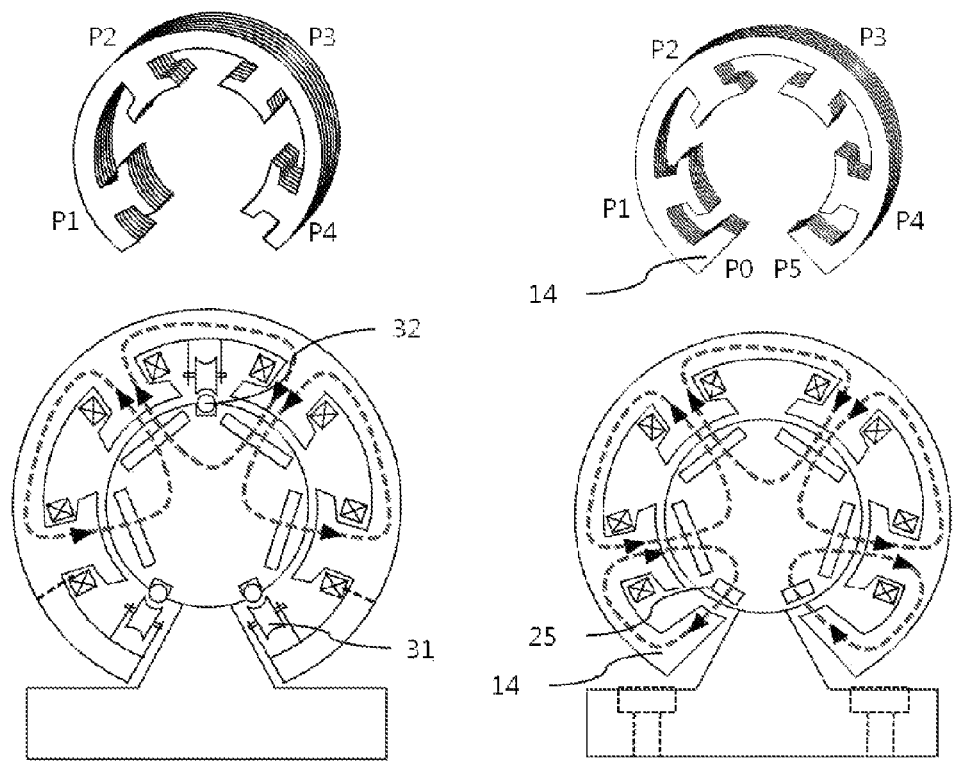
FIG. 5 illustrates the cross-section of an open type linear motor.

FIG. 5 illustrates one embodiment of an open type linear motor disclosed in 10-2009-0099828.

Like the linear motor depicted in FIGS. 1 to 3, the linear motor shown in FIG. 5 includes a first member including a plurality of armature modules arranged in a straight line in a moving direction, and a second member including a plurality of permanent magnet modules arranged at predetermined intervals in the moving direction. The second member and a supporting mechanism may be integrated together.

As shown in FIG. 5, unlike the armature module of FIG. 1 forming a ring-shaped closed circuit, the armature module according to the present invention includes a magnetic core having a C shape or an arc shape looking as if a circumferential portion of a magnetic ring of the armature module shown in FIG. 1 were removed, a plurality of salient poles projected from the magnetic core toward the permanent magnet module so as to form at least line symmetry (bilateral symmetry), and coils wound around the respective salient poles.

The arc may be a circular arc, which is a part of a circle, or may be in form of a part of a polygonal closed loop, for example, a part of a hexagonal, octagonal, and decagonal ring. Also, the arc may be formed in combination of polygonal arcs or polygonal or circular arcs. Here, the arc may be at least a line-symmetrical shape.

The plurality of salient poles, if possible, may be arranged to be point symmetrical with respect to the center of the permanent magnet module, thus contributing to canceling a magnetic attractive force generated between the salient poles and the permanent magnets. If it is difficult to achieve point symmetry, the plurality of salient poles may be arranged so as to for line symmetry with respect to vertical and horizontal axes.

Furthermore, the permanent magnet module includes the same number of permanent magnet poles as the number of salient poles with the coils wound around them in the armature module, and such permanent magnets are arranged to face the respectively corresponding salient poles.

The second member including the plurality of magnet modules may be fixed to a supporting mechanism (base) over the entire section in the moving direction, or be fixed to the supporting mechanism at predetermined intervals. The base serving as the supporting mechanism for fixing the second member may be fixed to the bottom through a plurality of fixing bolts aligned in the moving direction at both sides of the second member.

In the case of the armature module and the permanent magnet module of a basic model where coils are wound around every salient pole, the farthest salient pole (P1 or P4) from the center of the C-shaped magnetic body in the circumferential direction generates a magnetic flux flowing toward only the neighboring salient pole (P2 or P3) closer to the center of the C-shaped magnetic body. That is, a closed loop of a magnetic flux is formed only in one direction in the salient pole P1 (or P4), and thus a high magnetic flux cannot flow therein.

Accordingly, as shown in the drawing on the right side of FIG. 5, the armature module may further include auxiliary salient poles 14 (P0 and P5) respectively arranged at both ends of the C-shaped magnetic body and having no coil wound around them, and thus, the permanent magnet module may further include auxiliary permanent magnets 25 respectively located corresponding to the auxiliary salient poles 14 (an auxiliary salient pole type model), such that a closed loop of a magnetic flux can be formed even at the farthest salient pole (P1 or P4) from the center of the C-shaped magnetic body among the salient poles with the coils wound around them. In this case, the auxiliary permanent magnets 25 of the permanent magnet module may be omitted.

Meanwhile, the first member may include a roller 31 and a second member may include a guide rail 32 such that the first member can move in the moving direction while maintaining a predetermined gap between the salient poles of the first member and the corresponding permanent magnets of the second member. Here, a plurality of pairs of roller 31 and guide rail 32 may be provided forming line symmetry. The roller 31 may be provided between the salient poles in the armature module, and likewise, the guide rail 32 is formed between the permanent magnets in the permanent magnet module.

Figure 6:
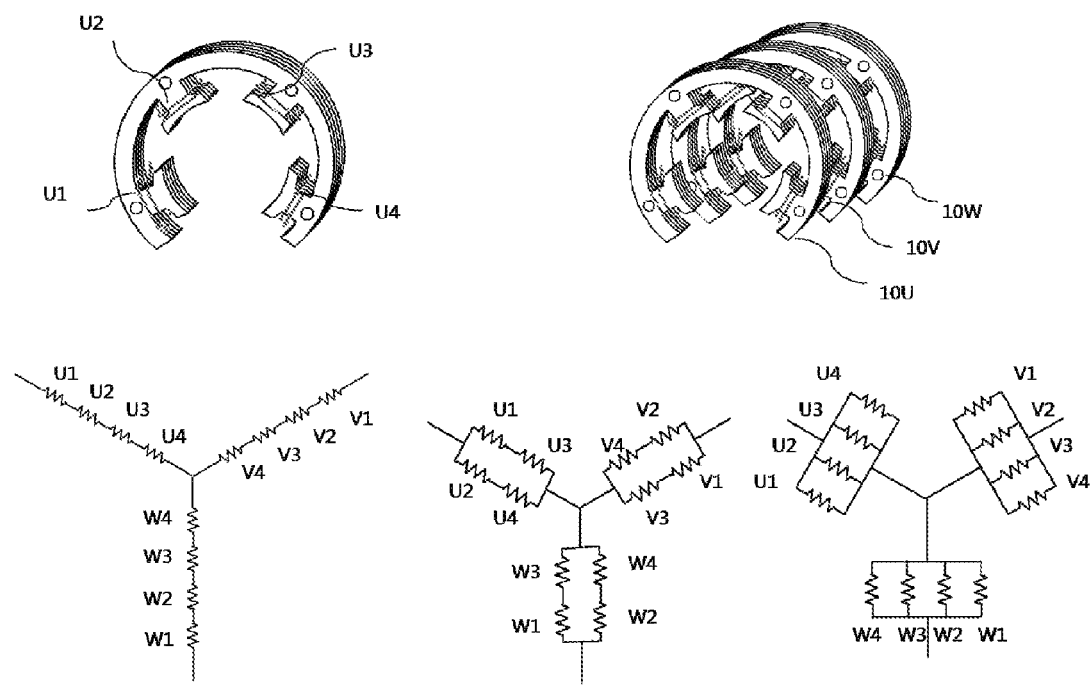
FIG. 6 illustrates an example of a method of connecting power applied to an armature module.

FIG. 6 illustrates an example e of connecting power applied to an armature module.

A U-phased armature module is configured as a C-shaped magnetic body, and includes a plurality of salient poles (four in FIG. 6) projected toward the second member, and coils wound U1, U2, U3 and U4 wound around the respective salient poles and through which a current of the same phase flows. A V-phased armature module and a W-phased armature module have the same structure as the U-phased armature module.

As a coil connection method for each armature module, a serial connection, a parallel connection, a serial-parallel connection, or the like may be selected.

As for a method of winding the coils around the salient poles of the armature module, the coils may be wound such that when the current of the same phase is supplied to the respective coils of the armature modules, different magnetic poles are formed in neighboring salient poles.

For example, if the coils U1 and U3 are wound clockwise, the coils U2 and U4 may be wound in a counterclockwise direction. Of course, all of the coils U1, U2, U3 and U4 may be wound in the same direction, and when lead lines are connected afterwards, the coils U1, U2, U3 and U4 may be connected so as to form different magnetic poles in neighboring salient poles when lead lines are connected afterwards.

The present invention discloses a modified example adopting the operational principles of the linear motors disclosed in 10-2009-0090806 and 10-2009-0099828 while reducing the weight of a second member including a permanent magnet module and improving assembly efficiency while.

In FIG. 1, the magnetic flux from the salient poles 12 with the coils 13 wound around them passes through the corresponding permanent magnets 21, is applied to the yoke 22, passes through the neighboring permanent magnets 21 and then flows into the neighboring salient poles 12. To make the magnetic flux smoother, the permanent magnets 21 may be attached to the yoke 21, which is a magnetic body, or be embedded in the yoke 22. However, since the yoke 22 is a magnetic body, reducing the weight of each permanent magnet module is limited.

That is, FIGS. 1, 4, and 5 are associated with a structure in which a magnetic flux from a salient pole around which a coil is wound passes through a permanent magnet, a yoke, a neighboring permanent magnet, and flows into a neighboring salient pole. In this structure, two permanent magnets and a yoke, which is a magnetic body that fixes the permanent magnets, are located between the salient pole to which the magnetic flux is to flow and the neighboring salient pole.

In the linear motor according to the present invention, salient poles with coils wound around them are projected more, and each permanent magnet are disposed between the salient poles such that a magnetic flux is continued even when a single permanent magnet is placed between the salient poles.

The linear motor according to the present invention may include a first member including coils generating a magnetic flux, and a second member including a permanent magnet crossing the magnetic flux.

Figure 7:
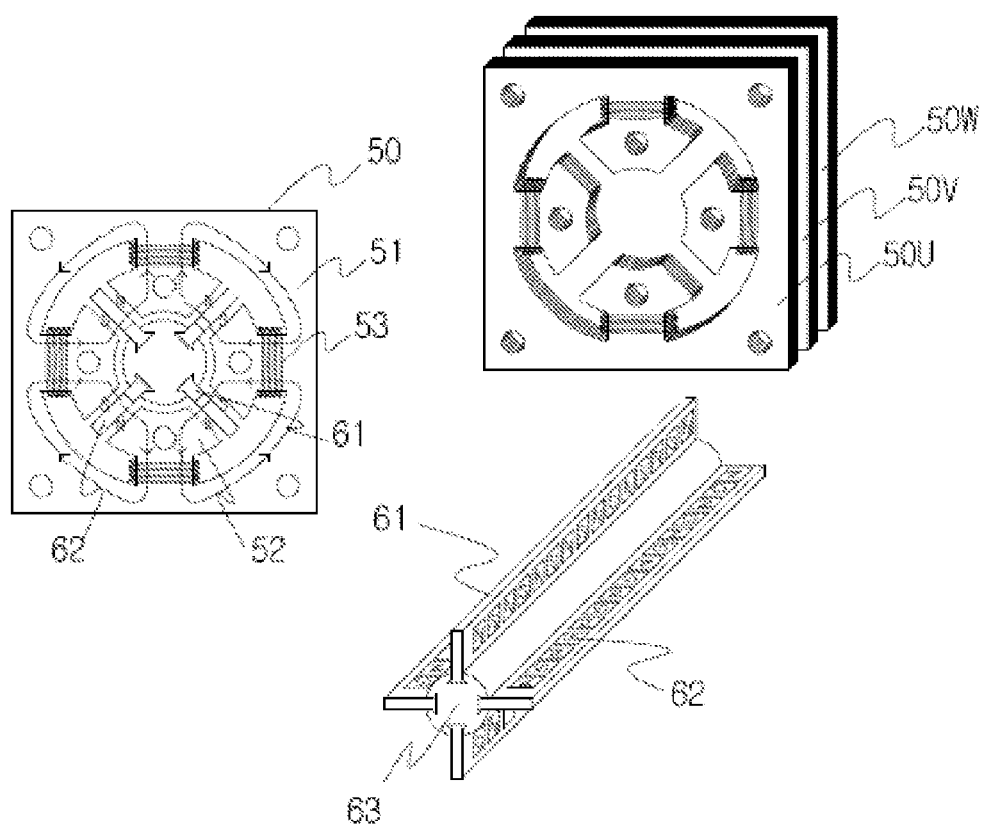
FIG. 7 illustrates the cross-section of a closed type linear motor and a second member including permanent magnets according to an embodiment of the present invention.

FIG. 7 illustrates the section of a linear motor and a second member including permanent magnets according to an embodiment of the present invention. FIG. 7 shows a closed-type linear motor.

The first member includes a plurality of armature modules 50 arranged in a row in a moving direction, and each armature module 50 includes a core 51, a plurality of salient poles 52, and coils 53. The armature core 51 connects the respective salient poles 52, and the coils 53 through which a current of the same phase flows are wound around the respective salient poles 52 or on the magnetic core 51 between the salient poles 52.

The second member includes a plurality of permanent magnet modules 61 each including permanent magnets 62, and a connection part 63 to which the permanent magnet modules are connected. Each permanent magnet module 61 is projected from the connection part 63 toward the core 51 of the armature module 50 and placed between two salient poles 52, and the plurality of permanent magnets may be arranged with their poles alternated in the moving direction of the motor.

A current is supplied to the coils 53 so as to form a moving magnetic field in the salient poles 52 of each armature module 50. The coils 53 of at least one of the armature modules 50 may be provided with a current having a phase difference from a current supplied to the coils of another armature module 50 such that a moving thrust is generated due to an attractive force and a repulsive force between electromagnetic poles formed at the salient poles 12 with the coils 13 wound around them, and the permanent magnets 21 corresponding to the electromagnetic poles.

Any one of the first member and the second member is a stator fixed to the supporting mechanism, and the other is a mover. The mover and the stator move relative to each other while maintaining a predetermined gap between the salient poles 52 of the armature module 50 and the permanent magnets 62 of the permanent magnet module 61.

In each armature module 50, electromagnetic polarities of neighboring salient poles 52 are rendered different from each other such that a pair of two neighboring salient poles 52 form a magnetic flux closed loop, thus allowing a high density magnetic flux to smoothly flow between the two salient poles 52 and the corresponding permanent magnet 62. In FIG. 7, four magnetic flux closed loops are formed by four salient poles 53 and four permanent magnets 62. To this end, in each armature module 50, the coils 53 through which a current of the same phase flows are wound around the respective salient pole 52 or the core 51 between the salient poles 52 while changing the winding direction so as to render the electromagnetic polarities of neighboring salient poles 52 different from each other in each armature module 50.

In the linear motor disclosed in 10-2009-0090806 and 10-2009-0099828, a second member includes a plurality of permanent magnet modules disposed at predetermined intervals in the moving direction, and each permanent magnet module includes a plurality of permanent magnets arranged in the circumferential direction and fixed to a yoke of a ferromagnetic body. A magnetic flux radiated from a salient pole of an armature module flows through a permanent magnet, the yoke and a neighboring permanent magnet.

That is, not only the first member but also the second member is modularized in order to prevent the magnetic flux from flowing in the moving direction of the motor (or the linear motor). This is because the permanent magnets of the second member are fixed to the yoke which is a ferromagnetic body.

According to the present invention, a magnetic flux radiated from a salient pole is applied to a neighboring salient pole through only a single permanent magnet. Since a yoke, which is a ferromagnetic body, does not exist, there is no need to modularize the second member with reference to the moving direction, and only the first member is modularized, so that a magnetic flux closed circuit where a magnetic flux flows perpendicularly to the moving direction can be formed.

The principle of generating a thrust is the same as that of the linear motors disclosed in 10-2009-0090806 and 10-2009-0099828. Thus, permanent magnets of the second member on the same displacement in the moving direction (on the same section when it is cut perpendicularly to the moving direction) need to be arranged such that the poles of the permanent magnets on the same displacement in the moving direction are alternated with those of their neighboring permanent magnets (as in the permanent magnet module A 20A of FIG. 2 in which permanent magnets are arranged in the order of N, S, N and S from the reference point of the circumferential direction). Also, permanent magnets at the same angle in the circumferential direction (permanent magnets arranged in the moving direction) need to be arranged such that the poles thereof are alternated with the poles of the neighboring permanent magnets (as in FIG. 2 in which when permanent magnets are arranged in the order of N, S, N and S from the reference point of the circumferential direction of the permanent magnet module A 20A, the permanent magnets of the permanent magnet module B 20B neighboring the permanent magnet module A 20A are arranged in the order of S, N, S and N of the opposite polarities to those in the permanent magnet module A 20A). Furthermore, since a magnetic flux coming out of a salient pole directly enters a neighboring salient pole through a permanent magnet without passing through a yoke, the permanent magnet needs to be projected between two neighboring salient poles through which a magnetic flux flows, and the magnetization direction of the permanent magnet needs to face the two salient poles.

In the left drawing of FIG. 7 showing the section of a motor, four permanent magnets 62 are radially provided, and each of the permanent magnets 62 is magnetized toward neighboring two salient poles 52 (in the circumferential direction) and is projected toward the core between the salient poles 52. The four permanent magnets 62 arranged counterclockwise from 45° with respect to the circumferential direction while respectively having magnetization directions S/N, N/S, S/N and N/S are sequentially arranged. Furthermore, the four permanent magnets 62 radially projected toward the core 51 are connected to the connection part 63 having a circular sectional shape.

Furthermore, in the drawing illustrating the second member on the right side of FIG. 7, the permanent magnets 63 at the same angle in the circumferential direction have N and S poles alternated in the moving direction. The permanent magnets at the same angle in the circumferential direction fixed to the single permanent magnet module 61 is connected to the connection part 63 having a circular sectional shape and having a bar shape elongated in the moving direction. The sectional shape of the connection part 63 is not limited to a circular shape.

The permanent magnets arranged at the same angle in the circumferential direction may be individually fixed to the connection part 3; however, as in the second member shown in FIG. 7, they may be fixed to a single permanent magnet module 61 and the permanent magnet module 61 may be connected to the connection part 63.

As shown in the cross-section of the motor in FIG. 7, the armature module 50 having the ring-shaped core includes four salient poles 52, and four permanent magnets 62 are projected between the salient poles 52. The four permanent magnets 62 are respectively fixed to four permanent magnet modules 61 corresponding to the permanent magnets 62. In the closed type electric motor as shown in FIG. 7, the core 51 is not limited to a circular ring shape, and may have a rectangular ring, an octagonal ring or the like, which forms a closed circuit. Also, the core 51 may have a polygonal shape having point symmetry or line symmetry, rather than a circular shape. To facilitate coupling with a neighboring armature module, through holes 54 may be formed in the corners of the core 51 or at the ends of the salient poles 52.

Furthermore, in a case where a high magnetic flux is required for high capacity, high speed or the like and thus there is a need to increase the sectional area of a motor, the motor may be modified such that the number of salient poles is a multiple of 2, for example, 6 or 8, and the number of permanent magnet modules is the same as the number of salient poles.

In a case where a magnetic flux flows between a salient pole and a permanent magnet, the leakage of the magnetic flux can be reduced when the gap between the salient pole and the permanent magnet is small, the magnetic flux flows perpendicularly to the surface of the salient pole and the permanent magnet, and the gap between the salient pole and the permanent magnet is uniform over the entire surface where the salient pole and the permanent magnet face each other. The gap between the salient pole and the permanent magnet may be determined in due consideration of the precision, speed, weight or the like of the linear motor, and the magnetization direction of the permanent magnet may be determined such that the magnetic flux can flow perpendicularly to the surface.

Also, in order to make the gap between the salient pole and the permanent magnet uniform over the entire surface where the salient pole and the permanent magnet face each other, a portion of the salient pole 52 closer to the core 51 has the coil 53 wound around it, and a portion of the salient pole 52 farther from the core 51 has the form of a circular sector and two radial lines, that is, an arc of the portion closer to the core 51 is rendered longer than an arc of the portion farther from the core 51, and a portion thereof facing the permanent magnet is rendered parallel to the permanent magnet 62 by linearly connecting the ends of the two arcs using the two radial lines.

The permanent magnet module 61 fixing the permanent magnets 62 arranged at the same angle in the circumferential direction is formed of a non-magnetic body, and has a plurality of openings for fixing the permanent magnets 62 in the moving direction. Any existing method may be used to fix the permanent magnets 62 to the openings of the permanent magnet module 61.

The connection part 63 of the second member has a plurality of recesses elongated in the moving direction to connect and fix the permanent magnet modules 61. Also, the permanent magnet modules 71 may have protrusions elongated in the moving direction to be inserted into the recesses of the connection part 63. Thus, the protrusion of the permanent magnet module 61 may be coupled with the recess of the connection part 63 by a sliding method of inserting and pushing.

The principle of generating a thrust in the moving direction is identical to that shown in FIG. 3. For example, in a case where two permanent magnets 62 arranged in the moving direction are made to correspond to three armature modules 50U, 50V and 50W, this becomes a combination of three phases of armature modules and two poles of permanent magnets as shown in the upper drawing of FIG. 3. A combination of the number (S) of armature modules and the number (P) of permanent magnets in the moving direction becomes a basic unit of a motor for generating a thrust, and this has been fully described above with reference to FIG. 3.

FIG. 8 illustrates permanent magnet modules 61 each having a plurality of permanent magnets 62 arranged to alternate poles in the moving direction. The section of the permanent magnet 62 through which a magnetic flux coming out of a salient pole 52 of an armature module 50 or entering the salient pole 52 has a rectangular or parallelogram shape by way of example.

When the distributing of a magnetic flux coming out of the salient pole 52 or entering the salient pole 52 is uniform, the amount of magnetic flux passing through the salient pole 52 and the permanent magnet 52 is in proportion to the area of a portion where the surface of the salient pole 52 overlaps the surface of the permanent magnet 50. A thrust is generated by variations in magnetic flux. For example, in a case where a second member as a mover moves in the moving direction, the amount of magnetic flux passing through the salient pole 52 and the permanent magnet 52 while the permanent magnet 62 is in motion becomes the result of the convolution of the surfaces of the salient pole 52 and the permanent magnet 63.

Assuming that the surface of the salient pole 52 facing the permanent magnet 63 has a rectangular shape (the width is in the moving direction and the length is in the radial direction on the left cross-section of FIG. 7), an area of a portion where the permanent magnet 63 having the rectangular surface overlaps the rectangular surface of the salient pole 52 while moving in the moving direction becomes a trapezoid shape as shown in the upper right drawing of FIG. 8. When the two surfaces begin to overlap each other, the twp surfaces fully overlap each other, the fully overlapping two surfaces start separating, the partially overlapping two surfaces are completely separated from each other, a point which is sharply connected (a point where two straight lines meet each other) is generated.

That is, a thrust is in proportion to a change in magnetic flux, that is, to a change in area of the overlapping surfaces of the salient pole 52 and the permanent magnet 62, and a value obtained by differentiating the area of the overlapping surfaces of the salient pole 52 and the permanent magnet 62 is associated with the thrust. Thus, in a case where there is a sharply connected point as shown in the upper right drawing, the thrust may undergo sudden changes at that point, and ripples may be caused.

However, the area of a portion where the permanent magnet 63 having a parallelogram surface overlaps the rectangular surface of the salient pole 52 while moving in the moving direction has a trapezoid shape overall. However, lines are smoothly connected, and thus the generation of ripples can be reduced. That is, a skew is applied to the permanent magnet through which a magnetic flux passes, that is, the permanent magnet is twisted, such that a detent force acting between the permanent magnet and the salient pole causes a slight phase difference according to the movement proceeds, reducing the detent force generating ripples in a thrust even while causing a slight reduction in thrust.

In the second member, it is assumed that since a permanent magnet 62 fixed to each permanent magnet module needs to have a different pole from a corresponding permanent magnet 62 of a neighboring magnet module 61, it is placed at the same location as the corresponding permanent magnet 62 on another permanent magnet module 62 in the moving direction. That is, in FIG. 9, a location offset (OFF_A) of a permanent magnet in a permanent magnet module A 61A has the same value as location offsets (OFF_B, OFF_C, and OFF_D) of other permanent magnet modules B, C and D 61B, 61C and 61D.

In this case, sharply connected points (points as shown in the upper right drawing of FIG. 8) when the surfaces of the salient pole 52 and the permanent magnet 62 overlap each other while the second member is moving in the moving direction are generated at the same time, increasing ripples.

To alleviate this problem, the location offset of the permanent magnet may be controlled to be different in each permanent magnet module 61 or in at least one of the permanent magnet modules 61. In this case, since the permanent magnet needs to have a different pole from a corresponding magnet 62 of a neighboring permanent magnet module 61, a small value relative to the width of a single permanent magnet 61 (a length in the moving direction) needs to be set as the location offset of the permanent magnet. For example, when the width of the permanent magnet 61 is L, at least one or two or more of their absolute values of location offsets OFF_A, OFF_B, OFF_C, and OFF_D are rendered different within a range smaller than 0.1 L, such that the sharply connected points as shown in the upper right drawing of FIG. 8 are not generated at the same time, thus preventing an increase in ripples.

Figure 10:
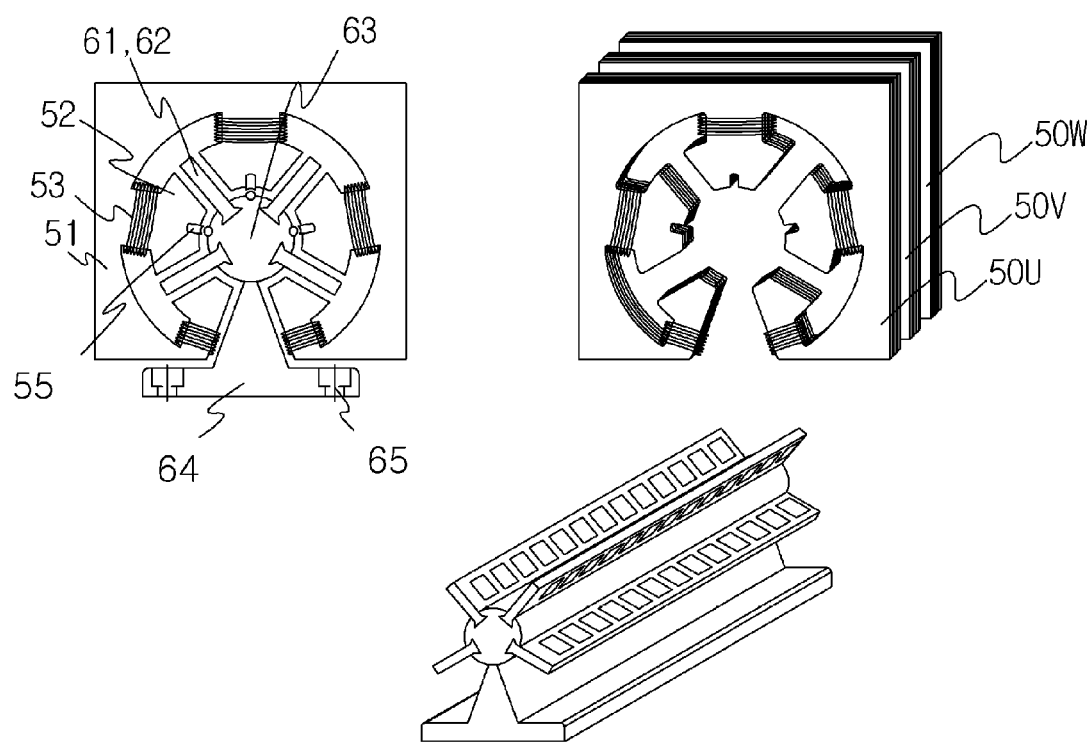
FIG. 10 illustrates an open type linear motor according to an embodiment of the present invention.

FIG. 10 illustrates an open type linear motor according to an embodiment of the present invention. The linear motor shown in FIG. 10 is a modification of the linear motor depicted in FIG. 7 for the application to a long distance conveying device having a long second member. In FIG. 10, reference numeral 64 indicates a base, 55 indicates a roller, and 65 indicates a fixing bolt for fixing a supporting mechanism on the floor.

The open type linear motor depicted in FIG. 10 is almost identical to the linear motor FIG. 7, except that the core 51 of the armature module 50 has an arc shape or a C-shape obtained by removing a portion of the circumferential section of a ring-shape core 51 forming a closed circuit such that an elongated second member can be connected to a supporting mechanism such as a base 64, and salient poles 52 are arranged at the core 51 to form bilateral symmetric instead of forming point symmetry. Accordingly, the embodiments of the core and the salient poles of the armature module described with reference to FIG. 5 may be applied to the embodiment shown in FIG. 10.

Figure 11:
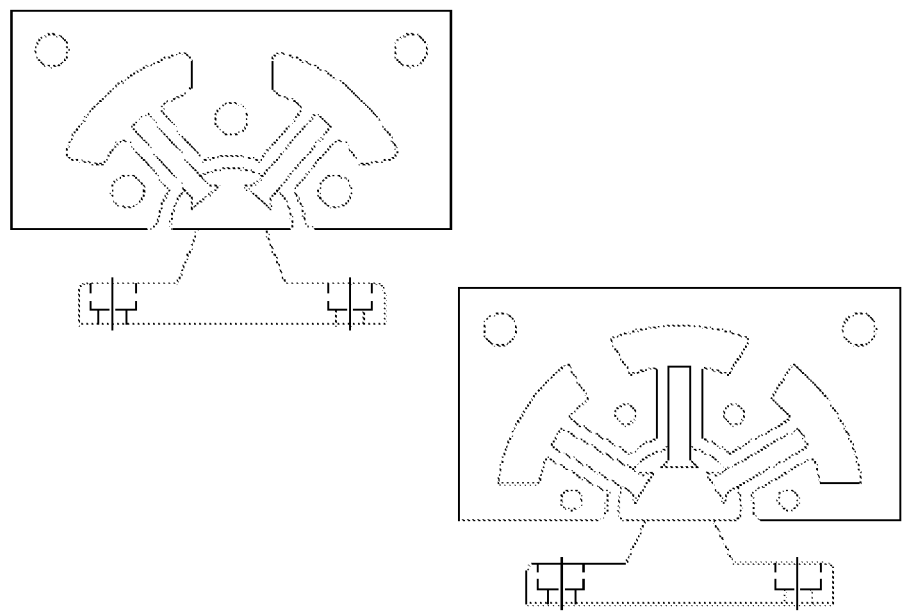
FIG. 11 illustrates a modification example in which the number of salient poles and the number of permanent magnet modules are modified in an open type linear motor according to an embodiment of the present invention.

In the closed type linear motor shown in FIG. 7, the number of salient poles 52 of the armature module is an even number of 4 or greater, and the number of the permanent magnet modules 61 needs to be the same as the number of salient poles 52. However, in the open type linear motor, the number of salient poles 52 is 3 or more regardless of an even number or an odd number, and the number of permanent magnet modules 61 is smaller than the number of salient poles. FIG. 10 illustrates an embodiment having five salient poles 52 and four permanent magnets, and FIG. 11 illustrates an embodiment having three salient poles 52 and two permanent magnet modules 61, and four salient poles 52 and three permanent magnet modules 61. However, the present invention is not limited to the illustration, and an embodiment having two salient poles 52 and a single permanent magnet module 61 is also available.

In a case where odd-numbered salient poles are arranged at an armature module, even-numbered salient poles excluding a single salient pole located in a center of the core may be arranged to form bilateral symmetric within an available range.

Alternatively, if odd-numbered salient poles are arranged at the armature module, even-numbered salient poles other than a single salient pole may be arranged to form bilateral symmetric such that left and right direction components of a magnetic attractive force are canceled each other (the single salient pole is arranged at a location where the magnetic attractive force of left and right direction components is not generated). Also, the salient poles may be arranged at a location where up and down direction components of the magnetic attractive force generated by the remaining even-numbered salient poles excluding the single salient pole (precisely, generated between the salient poles and the corresponding permanent magnets) can cancel a magnetic attractive force having only up and down direction components generated from the single salient pole as much as possible.

Alternatively, not only the location of the salient poles but also coil turns on each salient pole, the intensity of the permanent magnets respectively corresponding to the salient pole, and the like may be controlled such that the magnetic attractive forces generated between each salient pole and a corresponding permanent magnet can be canceled each other.

Figure 12:
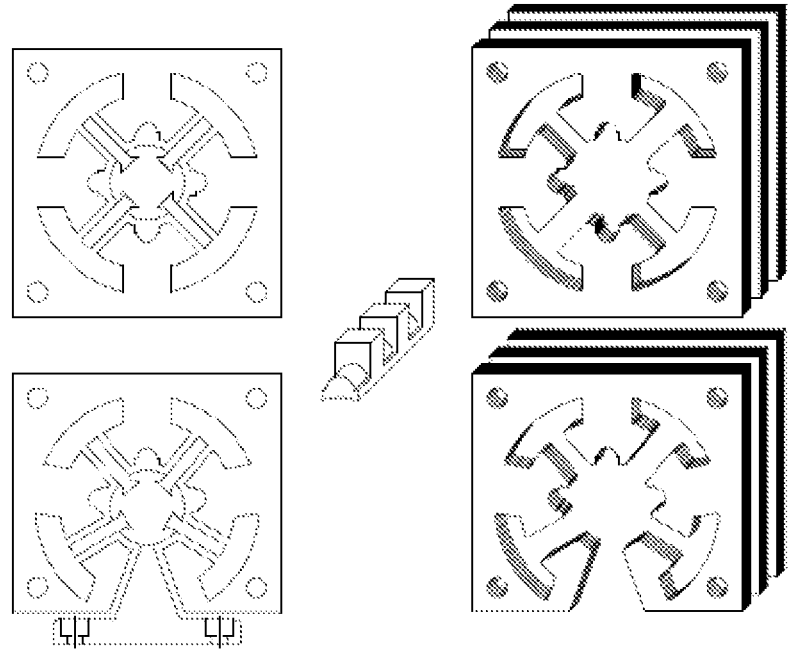
FIGS. 12 and 13 illustrate an example of maintaining a gap between armature modules by using spacers.

In order to maintain a predetermined gap between armature modules in a first member, as shown in FIG. 12, a recess having a predetermined shape is formed in an end of at least one salient pole (symmetrically located salient poles if possible) of each armature module, and the armature modules can be coupled with each other by using a spacer having a protrusion having a shape corresponding to the recess, and another protrusion having a width corresponding to the gap between the armature modules.

Figure 13:
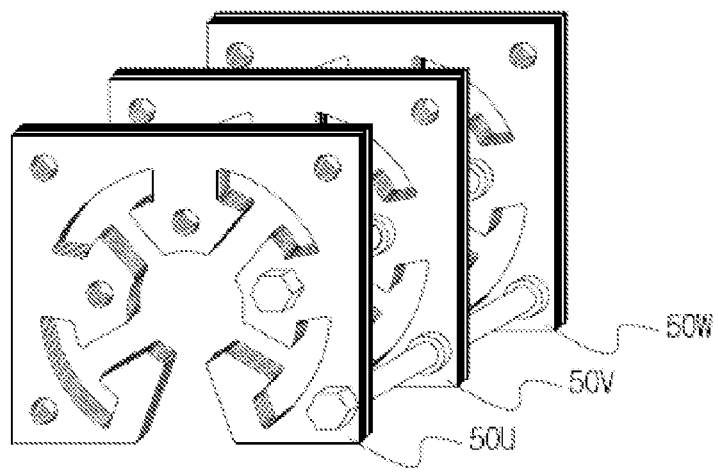

Alternatively, as shown in FIG. 13, a hole is formed in the ends of a core and/or at least one salient pole (symmetrically located salient poles if possible) of each of the armature modules, and the armature modules are coupled with each other by using a spacer with a hole and a through bolt. In such a manner, a predetermined gap between the armature modules can be maintained.

Figure 14:
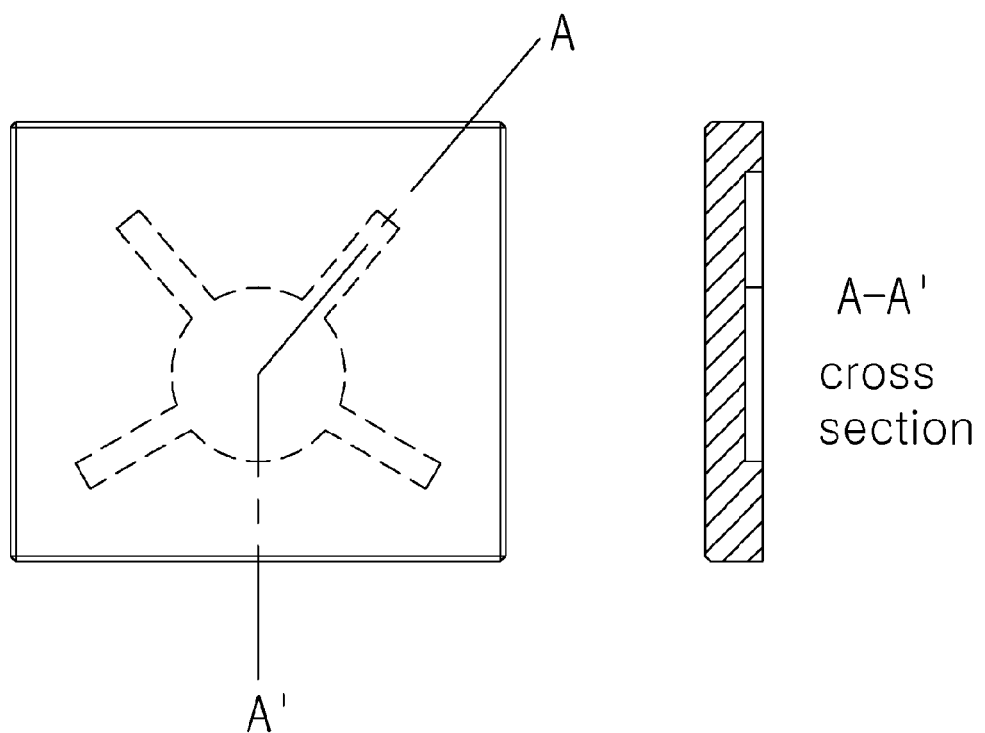
FIG. 14 illustrates an end stator for stably fixing a permanent magnet module.

Also, as shown in FIG. 14, end stators or brackets each having a recess corresponding to the cross-section of the second member perpendicular to the moving direction may be arranged at both ends of the second member, so that the permanent magnet modules 61 can be stably fixed so as not to be moved.

Figure 15:
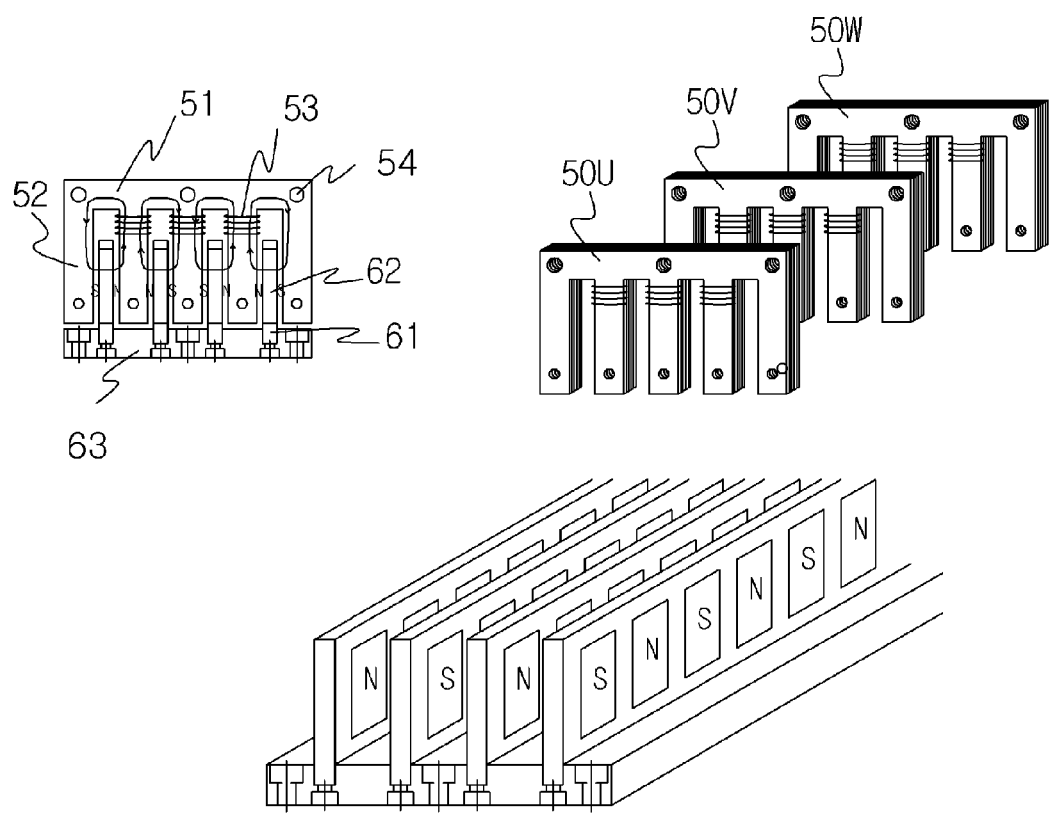
FIGS. 15 and 16 illustrate an open type linear motor according to another embodiment of the present invention.

FIG. 15 illustrates a modification of the open type linear motor shown in FIG. 10. In FIG. 10, reference numeral 54 is an assembly hole to maintaining a uniform gap between neighboring armature modules. In FIG. 15, the C-shaped core 51 of the armature module 50 is straightened, and thus the salient poles 52 are projected from the core at a right angle or in the same direction and are arranged side by side. Also, the permanent magnets 62 of the second member are projected toward the linear core 51 between two salient poles 52 arranged side by side. The plurality of permanent magnets 62 arranged in the moving direction may be fixed to the permanent magnet module 61. Since the permanent magnet modules 61 between the salient poles 52 are arranged side by side, a base, which is a type of supporting mechanism, serves as the connection part 63 for connecting the plurality of permanent magnet modules 61, that is, the base and the connection part 63 are integrated, such that the plurality of permanent magnet modules 61 can be directly fixed to the base.

Figure 16:
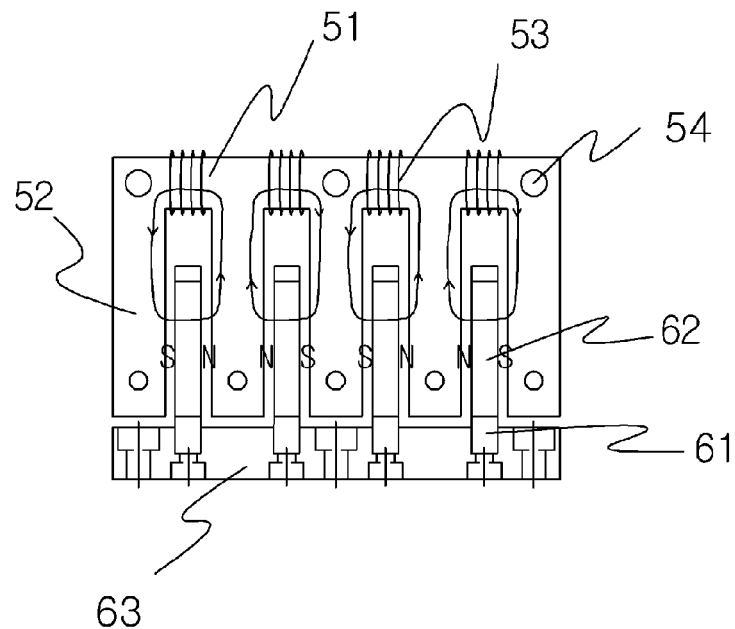

The coil 53 may be wound around a portion of each salient pole 52 closer to the core 51 (a portion that the permanent magnet 63 projected toward the core 51 does not reach) as shown in FIG. 15, or may be wound around the core 51 between two salient poles 52 as shown in FIG. 16.

In an embodiment where the coils are wound around the salient poles 52 as shown in FIG. 15, the coils are not wound around the first and fifth salient poles 52 among five salient poles 52, that is, the salient poles 52 located at both ends. Thus, the coils are not wound on every salient pole, and may be wound around only some of the salient poles. Also, in the embodiment shown in FIG. 15, the coils may be wound around the second and fourth salient poles in the same direction, and the third salient pole may not have a coil wound around it.

In the case of the linear motor of FIG. 10, the projection angle of each salient pole 52 of the armature module 52 is different, and thus high costs are required in manufacturing a mold and there is a limitation in enhancing precision. However, the linear motors shown in FIGS. 15 and 16, the core 51 and the salient poles 52 of each armature module 50 are at a right angle, and the base and the permanent magnet modules 61 are also at a right angle, thus enhancing manufacturing precision and saving costs for a mold.

Figure 17:
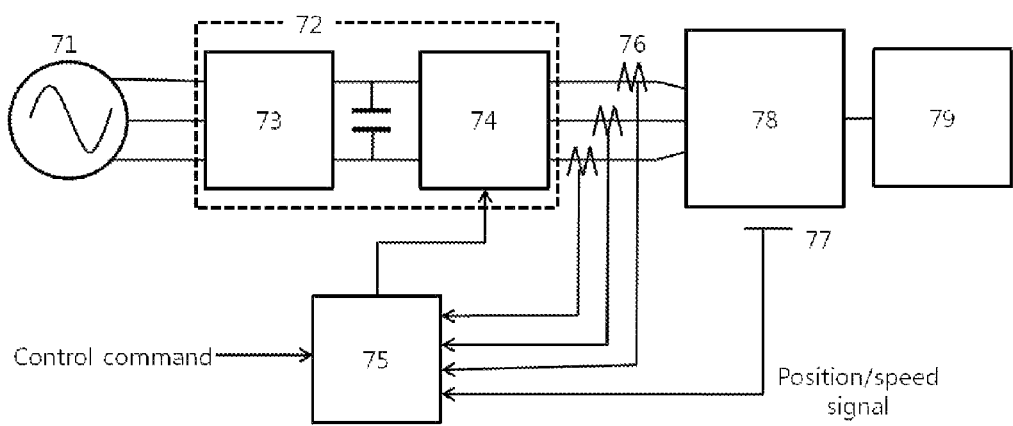
FIG. 17 illustrates the schematic configuration of a servo system for driving a linear motor according to an exemplary embodiment of the present invention.

FIG. 17 illustrates a schematic configuration of a servo system driving a linear motor according to an embodiment of the present invention. In FIG. 17, elements other than a linear motor 78 may utilize elements used in a related art linear motor.

The servo system may include a driving amp 72 for generating a current, which is to be applied to the linear motor 78 for moving an object 79, from power 71 supplied from the outside, a current sensor 76 for detecting a current applied from the driving amp 72 to the linear motor 78, a linear sensor 77 for detecting a location or a speed of a mover of the linear motor 78, and a controller 75 for controlling the driving amp 72 according to a control command on the basis of a signal detected by the current sensor 76 and/or the linear sensor 77. The driving amp 72 may include a converter 73 converting an AC power 71 into a DC, and an inverter 74 generating current required for motor driving.

The inverter 74 may generate power suitable for a driving scheme of the linear motor 78, for example, a 2-phase AC, a 3-phase AC, a 2-phase rectified current, a 3-phase rectified current, or the like and supplies the power to armature modules of the linear motor. A location and speed of the mover, and a magnitude of a thrust for moving the mover can be controlled by changing the amplitude, frequency or the like of the current according to a command of the controller 75.

As set forth above, in the linear motor according to an embodiment of the present invention, the abrasion of a guide, caused by a magnetic pull commonly generated in a plate-type linear motor can be prevented, a high thrust or a high conveying speed can be achieved even with a small size, and each element is modularized, thus facilitating assembly and allowing for various modifications.

Furthermore, the linear motor according to an embodiment of the present invention prevents deflection caused by the weight of a second member, and can be used in long-distance transfer.

Also, the linear motor according to an embodiment of the present invention achieves a reduction in the weight of the second member and enhances assembly efficiency.

Also, the linear motor according to an embodiment of the present invention reduces ripples in a thrust.

Furthermore, the linear motor according to an embodiment of the present invention can enhance manufacturing precision and save costs for a mold.

While the present invention has been shown and described in connection with the exemplary embodiments, it will be apparent to those skilled in the art that modifications and variations can be made without departing from the spirit and scope of the invention as defined by the appended claims.

What is claimed is:

1. A linear motor comprising;
a first member including a plurality of armature modules each of which comprises a magnetic core, a plurality of salient poles projected from the magnetic core, and coils, where the coils through which a current of a single phase flows are wound around a portion or all of the salient poles or the magnetic core between the salient poles; and
a second member including two or more permanent magnet modules, each of the permanent magnet modules including a plurality of permanent magnets arranged in a moving direction of the linear motor and a connection part for connecting the two or more permanent magnet modules, the permanent magnet module being projected from the connection part toward the magnetic core such that the projected permanent magnet module is placed between two adjacent salient poles of the armature module and a magnetization direction of the permanent magnets of the projected permanent magnet module faces the two adjacent salient poles, poles of the plurality of permanent magnets included in the permanent magnet module being alternated in the moving direction,
wherein power having a predetermined phase difference is supplied to the coil of each armature module such that a thrust according to a traveling magnet field is generated by using as one unit an S number of armature modules and a P number of permanent magnets arranged in the moving direction,
wherein one of the first member and the second member is a mover, and another one is a stator such that the mover and the stator are moved relative to each other by the generated thrust, and
wherein a location offset of the permanent magnets of at least one permanent magnet module being different from a location offset of the permanent magnets of another permanent magnet module within a range smaller than a width of the permanent magnet in the moving direction in order to prevent an increase in ripples.

2. The linear motor of claim 1, wherein in each armature modules the coils are wound round the salient poles such that neighboring salient poles in each of the armature modules have different polarities, and each permanent magnet in one permanent magnet module has a polarity different from that of a permanent magnet in another permanent magnet module neighboring the one permanent magnet module in a direction perpendicular to the moving direction.

3. The linear motor of claim 1, wherein a cross-section of the permanent magnet through which a magnetic flux passes in the permanent magnet module has a rectangular or parallelogram shape.

4. The linear motor claim 1, wherein the connection part has recesses elongated in the moving direction to fix the permanent magnet modules, and
the permanent magnet modules each have a protrusion to be inserted into the recess portion of the connection part, wherein the protrusion of the permanent magnet module and the recess portion of the connection part are slidingly coupled with each other.

5. The linear motor of claim 1, wherein the number of permanent magnet modules is the same as or smaller than the number of salient poles.

6. The linear motor of claim 1, wherein the magnetic core has a circular ring shape or a polygonal ring shape, four or more even-numbered salient poles are projected from the magnetic core so as to have point symmetry or line symmetry, and the number of permanent magnet modules is the same as the number of salient poles.

7. The linear motor of claim 6, wherein a section, perpendicular to the moving direction, of an end portion of each salient pole has two radial lines such that a gap between the salient pole and the permanent magnet corresponding to the salient pole is uniform over an entire surface where the salient pole and the permanent magnet face each other.

8. The linear motor of claim 7, wherein the coil is wound in a portion, near to the core, of the salient pole.

9. The linear motor of claim 1, wherein the magnetic core has an arc shape surrounding the second member and having line symmetry, the salient poles are projected from the magnetic core to have line symmetry, and the number of permanent magnet modules is smaller than the number of salient poles by one.

10. The linear motor of claim 9, wherein a section, perpendicular to the moving direction, of an end portion of each salient pole has two radial lines such that a gap between the salient pole and the permanent magnet corresponding to the salient pole is uniform over an entire surface where the salient pole and the permanent magnet face each other.

11. The linear motor of claim 10, wherein the coil is wound in a portion, near to the core, of the salient pole.

12. The linear motor of claim 1, wherein two or more of the salient poles are projected from the magnetic core in a same direction, and the number of permanent magnet modules is smaller than the number of salient poles by one.

13. The linear motor of claim 12, wherein the second member further comprises a connection part connecting the permanent magnet modules, and the permanent magnet modules are projected from the connection part in a same direction toward the magnetic core.

14. The linear motor of claim 1, wherein the first member or the second member have a length longer than the one unit including the S number of armature modules and the P number of permanent magnets.

15. The linear motor of claim 1, wherein the magnetic body of the armature module has a stratified form.

* * * * *